(12) United States Patent
Kondo et al.

(10) Patent No.: US 7,357,229 B2
(45) Date of Patent: Apr. 15, 2008

(54) ELECTROMAGNETIC SHOCK ABSORBER

(75) Inventors: Takuhiro Kondo, Tokyo (JP); Hideki Yamagata, Tokyo (JP); Yoshihiro Suda, Tokyo (JP)

(73) Assignees: Kayaba Industry Co., Ltd., Tokyo (JP); The Foundation for the Promotion of Industrial Science, Tokyo (JP)

( * ) Notice: Subject to any disclaimer, the term of this patent is extended or adjusted under 35 U.S.C. 154(b) by 267 days.

(21) Appl. No.: 10/515,812

(22) PCT Filed: May 28, 2003

(86) PCT No.: PCT/JP03/06670

§ 371 (c)(1),
(2), (4) Date: Jun. 6, 2005

(87) PCT Pub. No.: WO03/100291

PCT Pub. Date: Dec. 4, 2003

(65) Prior Publication Data

US 2005/0212189 A1    Sep. 29, 2005

(30) Foreign Application Priority Data

May 29, 2002   (JP)   ............................. 2002-155080
Jun. 6, 2002   (JP)   ............................. 2002-165784

(51) Int. Cl.
*F16F 15/03* (2006.01)

(52) U.S. Cl. ...................................... 188/267

(58) Field of Classification Search ................ 188/267, 188/266; 464/73, 74
See application file for complete search history.

(56) References Cited

U.S. PATENT DOCUMENTS 2,706,897 A * 4/1955 Holoye ........................ 464/73

(Continued)

FOREIGN PATENT DOCUMENTS

DE    35 22 221 A1    2/1986
JP    57-205422       12/1982
JP    205422/1982     12/1982

(Continued)

OTHER PUBLICATIONS

Lianggui Pu, "Elastic Coupling", Chapter 14: Shaft Coupling and Clutch, "Mechanical Design" (5th Version), Front and Back Cover, Table of Contents, p. 350, p. 355-356, Aug. 1989 (5th Version), China.

*Primary Examiner*—Thomas Williams
(74) *Attorney, Agent, or Firm*—Rabin & Berdo, P.C.

(57) ABSTRACT

An electromagnetic shock absorber according to the present invention has a shock absorber body 1 which makes telescopic motion in response to an input from outside. The shock absorber body 1 comprises a ball screw mechanism 15, which converts the telescopic motion into rotary motion and is composed of a ball nut 16 and a screw shaft 17, and power transmitting sections 13 and 24 having elastic bodies which transmit the rotary motion of the ball screw mechanism 15 to a rotary shaft 11 of a motor 10 while shifting a transmission phase when transmission torque of the rotary motion is changed. The motor 10 generates electromagnetic resistance to oppose against rotations which input into the rotary shaft 11. Thus, vibration or the like which inputs into the shock absorber body 1 from outside is damped by the electromagnetic resistance of the motor 10. Due to the power transmitting sections 13 and 24 which delay a rotary phase, moment of inertia of a rotor of the motor 10 is eased when a shocking load inputs into the shock absorber body 1. Therefore, it is possible to make a vehicle more comfortable to drive when the electromagnetic shock absorber is applied as a shock absorber of the vehicle.

8 Claims, 5 Drawing Sheets

U.S. PATENT DOCUMENTS

| | | | |
|---|---|---|---|
| 5,060,959 A * | 10/1991 | Davis et al. | 267/64.24 |
| 5,070,284 A * | 12/1991 | Patil et al. | 188/266.8 |
| 5,214,975 A | 6/1993 | Zalewski | |
| 5,678,847 A * | 10/1997 | Izawa et al. | 280/5.515 |
| 7,005,816 B2 * | 2/2006 | Hio et al. | 188/266 |
| 2005/0211516 A1* | 9/2005 | Kondo et al. | 188/267 |
| 2005/0230201 A1* | 10/2005 | Kondou et al. | 188/267 |
| 2006/0043804 A1* | 3/2006 | Kondou | 310/68 B |

FOREIGN PATENT DOCUMENTS

| | | |
|---|---|---|
| JP | 62002027 A * | 1/1987 |
| JP | 3-091551 | 4/1991 |
| JP | 91551/1991 | 9/1991 |
| JP | 05-044758 | 2/1993 |
| JP | 2552111 | 7/1997 |
| JP | 2001-173676 | 6/2001 |

* cited by examiner

ELECTROMAGNETIC SHOCK ABSORBER

TECHNICAL FIELD

The present invention relates to an electromagnetic shock absorber which converts telescopic motion of a shock absorber body into rotary motion of a motor utilizing a ball screw mechanism and damps vibration utilizing electromagnetic resistance generated by the motor.

BACKGROUND ART

A suspension unit for a vehicle in which a hydraulic shock absorber is arranged, in parallel with a suspension spring, between a car body and an axle is well known.

Further, Japanese Patent Laid-Open Publication No. 5-44758A has disclosed a suspension unit in which magnet coils are built in a hydraulic shock absorber. In this suspension unit, coils are attached to a cylinder of the hydraulic shock absorber and magnets are attached to a piston rod, respectively, and an electric current is applied to the coils, thereby generating driving force (electromagnetic force) along the direction of a stroke of the piston rod so as to control the quantity of telescopic motion of the suspension unit according to the traveling condition of a vehicle.

However, in such a suspension unit in which magnet coils are built in a hydraulic shock absorber, a hydraulic pressure, a power source, and the like are required, whereby it is complicated in structure and it is disadvantageous in respect of the costs.

On the other hand, a new electromagnetic shock absorber which does not require a hydraulic pressure, an air pressure, a power source, or the like is under study. Such an electromagnetic shock absorber is basically constituted as shown in an exemplified model of FIG. 6.

In this electromagnetic shock absorber, telescopic motion of the shock absorber is converted into rotary motion utilizing a ball screw mechanism and a motor is driven due to the rotary motion, and the telescopic motion of the shock absorber is damped by resistance generated by motor as an electromagnetic force.

A motor 50 is supported by a supporting frame 30, and there is provided a traveling frame 40 which is guided in such a manner that the traveling frame 40 can freely slide with respect to the supporting frame 30. Between a screw shaft 46 and a ball nut 47 which constitute a ball screw mechanism 45, the ball nut 47 is attached to the above-mentioned traveling frame 40, and the screw shaft 46 to be spirally engaged with the ball nut 47 is coaxially connected with a rotary shaft 51 of the above-mentioned motor 50 through a coupling 55.

The supporting frame 30 has an upper bracket 31, a lower bracket 33, and an intermediate bracket 32 which is located between the upper bracket 31 and the lower bracket 33. The supporting frame 30 is constituted in such a manner that these brackets are connected with each other by means of a plurality of connecting rods 34. The above-mentioned screw shaft 46 is rotatably supported, by a bearing 35 installed at the intermediate bracket 32, in such a manner that the screw shaft 46 goes through the bearing 35.

The traveling frame 40 has an upper bracket 41, a lower bracket 42, and a plurality of guide rods 43 which connect these brackets 41 and 42. The guide rods 43 of the traveling frame 40 slidably go through the lower bracket 33 of the above-mentioned supporting frame 30, whereby the guide rods 43 guide the traveling frame 40 in such a manner that the traveling frame 40 can slide in parallel with the screw shaft 46.

The above-mentioned ball nut 47 is attached to the upper bracket 41, and a large number of balls are arranged along a thread groove inside the ball nut 47 although these balls are not shown in the drawing. The screw shaft 46 is spirally engaged with the ball nut 47 through the large number of balls.

When the ball nut 47 together with the traveling frame 40 moves along the screw shaft 46, rotary motion is applied to the screw shaft 46 by the ball screw mechanism 45.

If the electromagnetic shock absorber is interposed between a car body and an axle, for example, and is utilized as a suspension of the car, a mounting bracket 36 of the supporting frame 30 which is located above the motor 50 and at an upper end of the electromagnetic shock absorber will be connected on the side of the car body, and a mounting eye 44 which is provided at the lower bracket 42 of the traveling frame 40 at a lower end of the electromagnetic shock absorber will be connected on the axle side.

When vibration inputs into the electromagnetic shock absorber from the surface of a road and the ball nut 47 makes linear motion in the direction of an arrow X together with the traveling frame 40, the screw shaft 46 makes rotary motion at that position due to spiral engagement of the thread groove of the screw shaft 46 and the balls which are arranged along the thread groove inside the ball nut 47.

The rotary motion of the screw shaft 46 is transmitted, as rotary motion of a rotary shaft 51 in the direction of an arrow Y, through the coupling 55 attached to an upper end of the screw shaft 46, thereby rotating the motor 50.

In the motor 50, for example permanent magnets are arranged at a rotor of the motor 50, and coils of a stat or of the respective magnetic poles short-circuit directly to each other or the coils are connected via a control circuit so that desired electromagnetic force can be obtained. Thus, with the progress of rotations of the rotor of the motor 50, electric currents flow through the coils due to induced electromotive force, and the electromagnetic force which arises resulting from the flow of electric currents becomes torque to oppose against the rotations of the rotary shaft 51 of the motor 50.

Additionally, it is possible to freely change the strength of rotational torque which is based on the electromagnetic force and opposes against the direction of rotations of the rotary shaft 51 by changing the strength of resistance due to the control circuit which is connected with the coils.

Electromagnetic torque which becomes resistance against the rotations of the rotary shaft 51 restrains the rotations of the above-mentioned screw shaft 46. After all, the torque operates as resistance to restrain linear motion of the ball nut 47 of the ball screw mechanism 45, that is, as damping force against the vibration which puts into the electromagnetic shock absorber.

However, with respect to an electromagnetic shock absorber constituted such that the screw shaft 46 is directly connected with the rotary shaft 51 of the motor 50 by the coupling 55 and the rotary motion of the shaft 46 is transmitted to the motor 50, it is feared that the following problems may arise if the electromagnetic shock absorber is actually applied to a vehicle.

First, characteristics of the damping force which is generated by the electromagnetic shock absorber are taken into consideration. With the progress of the linear motion of the ball nut 47, the screw shaft 46 rotates and the rotary motion is transmitted to the motor 50. Because the moment of inertia of the rotor inside the motor 50 is relatively large, its influence on damping force cannot be ignored.

Here, a description as to how the moment of inertia affects the above-mentioned damping force will be given.

The damping force generated by the electromagnetic shock absorber, namely, the resistance (load) against the telescopic motion is approximately the sum total of the moment of inertia of the rotor of the motor, the moment of inertia of the screw shaft, and the electromagnetic resistance generated by the motor. Because angular acceleration of the rotary shaft of the motor is proportional to acceleration of the telescopic motion of the shock absorber, the moment of inertia of the rotor is proportional to the acceleration of the telescopic motion of the shock absorber.

As described above, the moment of inertia of the rotor is proportional to the acceleration of the telescopic motion of the shock absorber and therefore the damping force which is not based on the electromagnetic force of the motor is generated against the force in an axial direction of the shock absorber which is input from the surface of a road into the shock absorber. Especially if sudden force in an axial direction is input, greater damping force, namely, resistance against vibration will be generated by the rotor accordingly. This exceedingly high damping force does not absorb the vibration and the vibration is directly transmitted to the side of a car body as it is.

Therefore, the damping force due to the moment of inertia of the rotor of the motor always arises prior to generation of the damping force which depends on the electromagnetic force of the motor. Moreover, because the moment of inertia of the rotor is relatively great as described above, if it is possible to exclude or restrain the influence which the moment of inertia of the rotor exercises on the damping force, vibrational absorption capacity will be increased accordingly. This makes vehicles more comfortable to drive.

Especially, referring to the electromagnetic shock absorber's controllability over damping force, it is difficult to control the damping force which arises resulting from the moment of inertia of the rotor of the motor closely relevant to the acceleration of telescopic motion of the above-mentioned shock absorber. Thus, it is preferable that the above-mentioned moment of inertia is less influential.

Next, durability of the motor 50 will be taken into consideration. According to input speed of pushing up force from a road surface, vibration, or the like which is applied from the surface of a road to the electromagnetic shock absorber while a vehicle is traveling, the traveling frame 40 travels and the ball nut 47 of the ball screw mechanism 45 makes linear motion at the same speed as the traveling speed of the traveling frame 40. The screw shaft 46 also rotates at a speed in proportion to the speed of the linear motion, and the rotary shaft 51 of the motor 50 also rotates at the same speed as that of the screw shaft 46.

In this case, when the above-mentioned input speed of vibration or pushing up forth is suddenly increased, it is possible to temporarily exceed an allowable rotational speed of the motor 50. Especially if rapid telescopic motion is commenced when the shock absorber is in a stationary state or when slow telescopic motion is in progress, the rotational speed of the motor will extremely increase in a moment. In this case, a calorific value of the coils of the motor 50 will be great, and the calorification will induce a chemical change or the like in insulating coating of conducting wires which form the coils. This will lead to the deterioration of insulation performance. As a result, it is feared that electric leakage may occur and the motor itself may be damaged.

The motor 50 is more expensive than other parts of the electromagnetic shock absorber. Therefore, it is desirable to make every effort to prevent the motor 50 from being damaged.

DISCLOSURE OF THE INVENTION

An advantage of the present invention is to provide an electromagnetic shock absorber which is capable of restraining the influence that moment of inertia of a rotor of a motor exercises on damping force and which is capable of making vehicles more comfortable to drive and promptly controlling the damping force according to the traveling conditions in the case that the shock absorber is applied to the suspension of a vehicle.

A further advantage of the present invention is to provide an electromagnetic shock absorber being capable of preventing a motor from being subjected to damage, as much as possible, which may arise resulting from calorification of the motor and enabling repair of breakdown at a low cost.

In order to achieve the advantages described above, the electromagnetic shock absorber according to the present invention comprises: a shock absorber body which makes telescopic motion in response to an input from outside; a ball screw mechanism which is arranged at the shock absorber body, converts the telescopic motion into rotary motion, and is composed of a ball nut and a screw shaft; a motor which is provided at the shock absorber body and generates electromagnetic resistance to oppose against rotations to be input into a rotary shaft of the motor; and a power transmitting section having an elastic body which transmits rotary motion of the ball screw mechanism to the rotary shaft of the motor and also shifts a transmission phase of the rotary motion when rotation torque of the rotary motion is changed.

Further, it is preferable to have constitution such that at least a part of the power transmitting section includes a torsion bar.

The torsion bar is constituted such that the torsion bar will break if the above-mentioned rotary torque to be transmitted is greater than a prescribed value.

Further, it is constituted such that the power transmitting section is composed of a drive section and a driven section and the elastic body is provided on a torque transmission surface which intervenes between the drive section and the driven section.

projections provided at the power transmitting section are constituted such that the projections will break if the above-mentioned rotation torque to be transmitted is greater than a prescribed value.

It is preferable that the above-mentioned prescribed value corresponds to a torque value at a time when a rotational speed of the motor to be rotated due to the rotation torque reaches an allowable rotational speed.

Therefore, according to the present invention, when the telescopic motion of the shock absorber body is transmitted to the rotary shaft of the motor as the rotary motion, a time-lag of phase arises and it is possible to delay the generation of great damping force which arises resulting from the moment of inertia of the rotor in the motor or reduce the great damping force. Thus, in the case of applying the electromagnetic shock absorber to a suspension of a vehicle, the vehicle can be made more comfortable to drive and damping force can promptly be controlled according to the traveling conditions.

Further, when a speed of rotary motion which may arise resulting from rapid telescopic motion of the shock absorber body exceeds an allowable rotary speed of the motor, at least a part of the power transmitting section breaks and prevents the motor from excessively rotating. Therefore, it is possible to prevent the motor from being subjected to damage which may happen resulting from calorification of the motor.

BEST MODE FOR CARRYING OUT THE INVENTION

Figure 1:
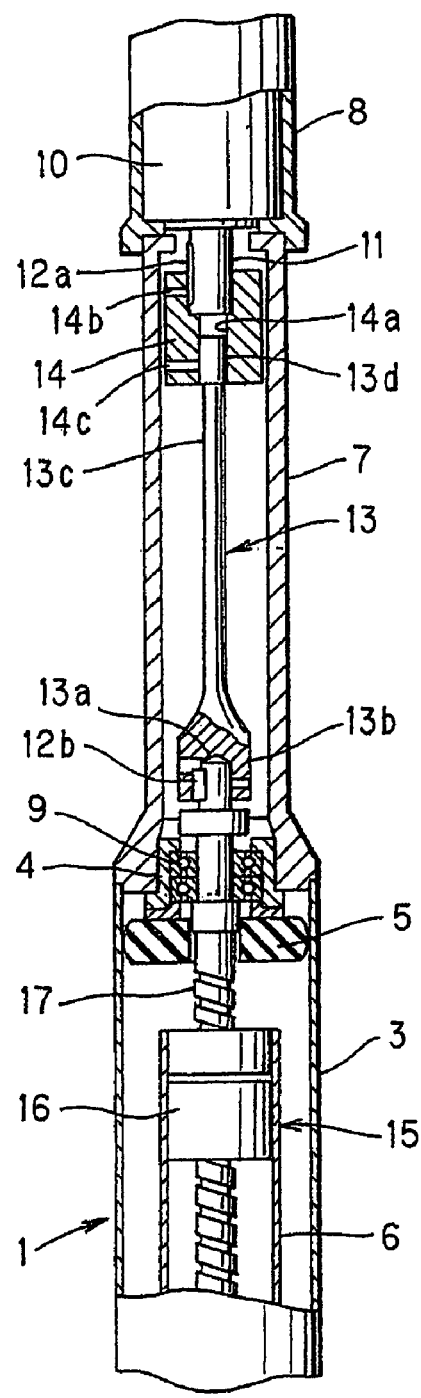
FIG. 1 is a sectional view showing an electromagnetic shock absorber according to a first embodiment of the present invention.
Figure 2:
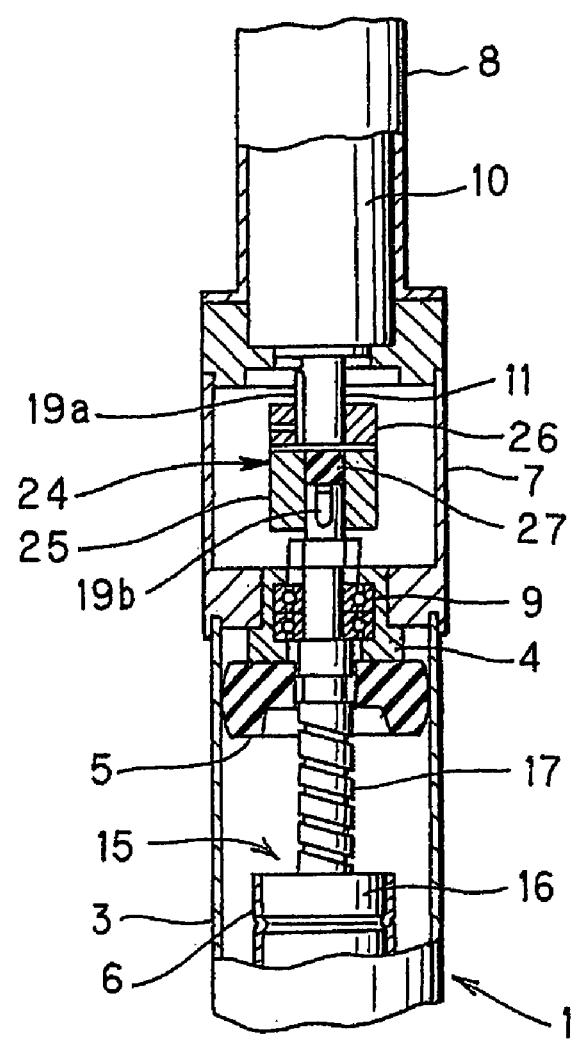
FIG. 2 is a sectional view showing an electromagnetic shock absorber according to a second embodiment of the present invention.

Description of the embodiments shown in the drawings will subsequently be given.

FIG. 1 is a sectional view showing an electromagnetic shock absorber according to a first embodiment.

A shock absorber body 1 has an external cylinder 3 and an internal cylinder 6 which is coaxially inserted in the external cylinder 3 in such a manner that the internal cylinder 6 can freely slide in the external cylinder 3. However, a sliding position of the internal cylinder 6 in the external cylinder 3 is located at a lower part of the external cylinder 3 which is omitted from the drawing.

Further, a cylindrical case 7 is coaxially connected at an upper part of the external cylinder 3, and a motor 10 housed in a housing 8 is installed at an upper part of the case 7.

At an upper end of the internal cylinder 6 which slides with respect to the external cylinder 3, a ball nut 16 which constitutes a ball screw mechanism 15 is installed. A screw shaft 17 to be spirally engaged with the ball nut 16 extends to the inside of the internal cylinder 6. A thread groove of the screw shaft 17 is guided and spirally engaged with a large number of balls which are arranged on a thread groove in the ball nut 16. When the ball nut 16 moves in an axial direction together with the internal cylinder 6, the screw shaft 17 rotates at the position, more specifically, linear motion of the ball nut 16 is converted into rotary motion of the screw shaft 17.

Additionally, the ball screw mechanism 15 has a function of converting the linear motion into the rotary motion very smoothly and without resistance by spiral engagement of the large number of balls and the thread groove, and thus the ball screw mechanism 15 is the most preferable one. However, a mechanism to convert the linear motion into the rotary motion is not always restricted to the ball screw mechanism 15. The ball screw mechanism 15 will not be an obstacle to adoption of another mechanism which has a similar effect.

An upper end of the screw shaft 17 which goes through the ball nut 16 is supported by a ball bearing 9 which is installed inside a lower end of the case 7 through a retention member 4 in such a manner that the screw shaft 17 can freely rotate and does not fall off downward. Additionally, an annular cushion member 5 is installed on a lower surface of the retention member 4. When the internal cylinder 6 goes up, the annular cushion member 5 elastically meets with the internal cylinder 6 at the uppermost position so that the shock is cushioned and also a further upward movement of the internal cylinder 6 is stopped.

Although the details will be described later, a torsion bar 13 is first arranged as a power transmitting section at a case shaft center section in the case 7. An upper end of the screw shaft 17 is inserted at a lower end of the torsion bar 13 and fixed by a key or the like so as to prevent mutual rotations. An upper end of the torsion bar 13 is coaxially connected with a rotary shaft 11 of the motor 10 by a coupling 14.

A bracket not shown in the drawing is installed above the external cylinder 3 and at an upper end of the housing 8 in which the motor 10 is housed. A bracket is also installed at a lower end of the internal cylinder 6. Between the brackets, using the upper bracket, connection with the car body side is made, on the other hand, using the lower bracket, connection with the axle side is made.

Due to such constitution as described above, when external force, such as pushing up force or vibration, inputs into the internal cylinder 6 which is at a lower part of the shock absorber body 1 while a vehicle is traveling, the internal cylinder 6 moves in axial direction with respect to the external cylinder 3 in response to the input, more particularly, telescopic motion such as ascent and descent is made.

Due to the ball screw mechanism 15 composed of the ball nut 16, which is installed at the internal cylinder 6, and the screw shaft 17 which is connected with the motor 10 through the power transmitting section, linear motion of the internal cylinder 6 is converted into rotary motion of the screw shaft 17 at this time. In this case, a direction of the rotary motion of the screw shaft 17 is switched according to a direction of movement of the ball nut 16, and the direction of the rotary motion differs depending on the cases that the internal cylinder 6 shrinks and extends with respect to the external cylinder 3.

The rotary motion of the screw shaft 17 is transmitted to the rotary shaft 11 of the motor 10 through the torsion bar 13 and the coupling 14 and thus rotation driving force acts on the motor 10.

With respect to the motor 10, coils of respective magnetic poles are electrically connected to each other or connected via a control circuit. Thus, when rotary torque is transmitted to the rotary shaft 11 of the motor 10, induced electromotive force occurs to the coils and electromagnetic force which opposes against an input of rotations of the motor is always generated. This electromagnetic resistance restrains rotary motion of the screw shaft 17, and after all resistance is applied to telescopic motion of the shock absorber body 1 which is linear motion of the internal cylinder 6 so as to generate damping force by the electromagnetic shock absorber.

The motor 10 functions as a source of the outbreak of the electromagnetic resistance and various motors, such as a direct current motor, an alternating current motor, or an induction motor, are applicable.

To take the case of the direct current motor, although it is not shown in the drawing, in the case of a motor with direct current brush, a stat or to which a plurality of permanent magnets for generating magnetic fields are attached and a rotor to which coils constituting a plurality of magnetic poles are attached are arranged in the motor. Coils of respective magnetic poles are connected to each other and thus the rotary shaft of the motor is rotated and the rotor rotates. Whichever direction the motor is rotated when the coils generate induced electromotive force by going across magnetic fields generated by permanent magnets, electromagnetic force which acts on the motor as resistance against rotations of the motor is generated. Thus, as described above, damping force which opposes against vibration or the like to be input into the electromagnetic shock absorber is generated.

Strength of the electromagnetic force to be generated by the coils can freely and instantaneously be adjusted, for example, by switching the strength of resistance of the control circuit to be connected with coils of respective magnetic poles. Thus, it is possible to freely and promptly control the damping force which is generated according to driving status of a vehicle or the like.

Next, detailed description of the power transmitting section will be given. The power transmitting section is composed of the torsion bar 13, which is an elastic deformation member, and the coupling 14 which is connected with the torsion bar 13.

The torsion bar 13 is formed in one united body by a slender, stick-type torsion bar body 13c with a smaller sectional area, a lower connecting section 13b which is provided at a lower end of the body 13c and has a sectional area larger than that of the body 13c, an opening 13a which is concentrically provided at a lower end of the connecting section 13b, and an upper connecting section 13d which is provided at an upper end of the body 13c.

Further, the coupling 14 has a stepped hole 14a therein and is roughly cylindrical. The rotary shaft 11 of the motor 10 is inserted into the stepped hole 14a from above, on the other hand, the upper connecting section 13d of the torsion bar 13 is inserted from bottom.

A key way is provided at the rotary shaft 11 and the stepped hole 14a, respectively, and a key 12a is inserted into the key way, so that the rotary shaft 11 and the coupling 14 are connected to prevent their idle running.

Further, in order to fix the rotary shaft 11 and the connecting section 13d, a thread hole 14b and a thread hole 14c are provided at an upper part and a lower part of a lateral surface of the coupling 14, respectively, in such a manner that these thread holes 14b and 14c go through up to the stepped hole 14a, respectively. Screws not shown in the drawing are spirally engaged with the thread holes 14b and 14c, respectively, and therefore it is possible to fix the rotary shaft 11 and the torsion bar 13 to prevent their mutual idle running.

Further, an upper end of the screw shaft 17 is connected to a lower end of the torsion bar 13. Thus, the upper end of the screw shaft 17 is inserted into the opening 13a of the torsion bar 13, and a key 12b is inserted into a key way provided on an insertion surface of the opening 13a and the screw shaft 17, so that the torsion bar 13 and the screw shaft 17 are connected to prevent their mutual idle running.

Next, operation will be described.

In the case that the electromagnetic shock absorber is applied as a suspension of a vehicle, when an impact from a surface of a road, such as pushing up force or vibration, acts on the internal cylinder 6 while the vehicle is driving, the internal cylinder 6 makes linear motion in a direction of the telescopic motion along the external cylinder 3. The linear motion of the ball nut 16 which moves together with the internal cylinder 6 in one united body is converted into rotary motion of the screw shaft 17 by the ball screw mechanism 15.

Because the screw shaft 17 is connected with the rotary shaft 11 of the motor 10 through the torsion bar 13 and the coupling 14, the rotary shaft 11 of the motor 10 also rotates.

When the rotary shaft 11 of the motor 10 rotates, the coils inside the motor 10 go across the magnetic fields of permanent magnets. Thus, induced electromotive force is generated and electromagnetic force is generated so as to oppose against rotations of the motor 10. Because the rotary shaft 11 is connected with the screw shaft 17 through the torsion bar 13, the electromagnetic force operates to restrain the rotational movement of the screw shaft 17 and the movement of the ball nut 16 in a direction of telescopic motion of the shock absorber is restrained. More specifically, the electromagnetic force operates as damping force to restrain the linear motion of the internal cylinder 6 along the external cylinder 3 and in a direction of telescopic motion, impact energy from the surface of a road is absorbed and eased, a vehicle is made more comfortable to drive, and drivability is improved.

Additionally, when rotary force, namely, rotary torque is applied to the torsion bar 13 which is about to rotate in response to the rotary movement of the screw shaft 17 due to vibration or the like which inputs in the electromagnetic shock absorber from outside, the torsion bar 13 absorbs the rotary force and while being twisted according to the torque, the torsion bar 13 transmits the torque not only to the coupling 14, but also to the rotary shaft 11 of the motor 10.

Therefore, rotary motion of the torsion bar 13 is not directly transmitted to the rotary shaft 11. Especially, when the screw shaft 17 starts rotating or when the rotary speed is changed, it leads to such a phenomenon that a change of the rotary speed of the rotary shaft 11 of the motor 10 lags behind a change of the rotary speed of the screw shaft 17.

Therefore, when the linear motion of the internal cylinder 6 along the external cylinder 3 is commenced or when a speed of the linear motion is changed after great force is applied from an axial direction to the internal cylinder 6 of the electromagnetic shock absorber, generation of moment of inertia of the rotor of the motor 10 is delayed.

This delays the generation of damping force resulting from moment of inertia of the rotor of the motor 10, thereby slowing down the generation of the damping force which is hard to control and is generated due to moment of inertia of the rotor when telescopic motion of the electromagnetic shock absorber is commenced or at the initial stage of a speed change. Thus, especially if it is used as an electromagnetic shock absorber of a vehicle, it will make great contributions to realization of a comfortable vehicle to drive.

Additionally, because the torsion bar 13 transmits rotary motion of the screw shaft 17 to the rotary shaft 11 of the motor 10, it will be sufficient if the torsion bar 13 is made with materials capable of securing prescribed strength against the torque which may arise due to the screw shaft 17 or the motor 10. However, an aim of the present invention is that when the screw shaft 17 commences rotary motion or when the rotary speed changes, transmission of rotations of the screw shaft 17 to the rotary shaft 11 of the motor 10 is delayed. Thus, it is preferable that by changing a sectional area or materials of the cross section of the torsion bar 13 in the design, torsional rigidity of the torsion bar 13 is adjusted and a difference of the rotary speed is rendered optimal for a vehicle to which the electromagnetic shock absorber is applied.

Further, for example, if shear strength of the torsion bar 13 is set so that the body 13c of the torsion bar 13 is cut when a rotary torque, which angular acceleration reaches an allowable rotational speed of the motor 10 after a specific time period, for example, one second has passed from the beginning, is applied to the torsion bar 13, the torsion bar 13 will be cut when sudden force in an axial direction is applied from the surface of a road to the internal cylinder 6. Thus, it is possible to avoid that a rotary speed of the rotary shaft 11 exceeds the allowable rotary speed of the motor 10 which may arise resulting from sudden telescopic motion of the electromagnetic shock absorber.

Thus, it is possible to prevent a rotary speed of the rotary shaft 11 of the motor 10 from exceeding the allowable rotary speed of the motor 10, thereby preventing the motor 10 from being subjected to damage which may arise resulting from heat generated by the coils of the motor 10.

Further, it is possible to prevent the motor 10 which is more expensive than other parts from being damaged even though the torsion bar 13 is cut. Therefore, a function of the electromagnetic shock absorber can be recovered merely by exchanging the torsion bar 13 even when it is required to repair the electromagnetic shock absorber, whereby it has the effect of reducing the repair cost.

In the case that the electromagnetic shock absorber is applied to a vehicle, as described above, even though the torsion bar 13 is cut, it will be possible to avoid a state of being incapable of traveling although damping characteristics are lost if a suspension spring is installed together with the electromagnetic shock absorber because the vehicle is supported by the suspension spring.

Further, in this embodiment, the torsion bar 13 is used for the power transmitting section in consideration of facilitation in installation and fabrication. However, the present invention is directed to delay the generation of damping force due to moment of inertia of the rotor of the motor 10 by producing a difference of the rotary speed described above. Thus, for example, an electromagnetic clutch may be used for the power transmitting section.

Further, the torsion bar 13 is formed in one united body as described above, but it is not always restricted to this type. As long as it has a part which is twisted by rotary torque to be input, another configuration is acceptable.

Further, from viewpoint of the present invention, it is desirable that the coupling 14 has small moment of inertia, if possible.

Next, description of a second embodiment shown in FIG. 2 through FIG. 5 will be given.

In this embodiment, the constitution is such that a coupling 24 in which an elastic body is arranged is provided as the power transmitting section described above, whereby transmission of rotary torque is delayed, and when rotary torque which a rotary speed of the motor 10 exceeds an allowable limit speed is applied, a vulnerable section is cut and transmission of the rotary torque is stopped.

In this embodiment, the screw shaft 17 is directly connected with the rotary shaft 11 of the motor 10 by the coupling 24.

Figure 3:
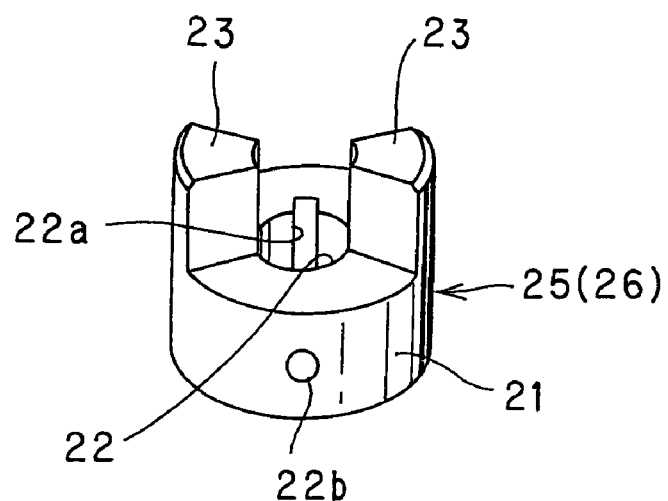
FIG. 3 is a perspective view of a drive section or a driven section which is a component of a coupling.
Figure 4:
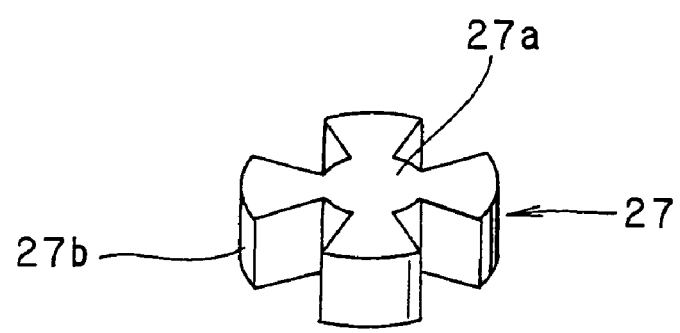
FIG. 4 is a perspective view of an elastic body which is also a component of the coupling.
Figure 5:
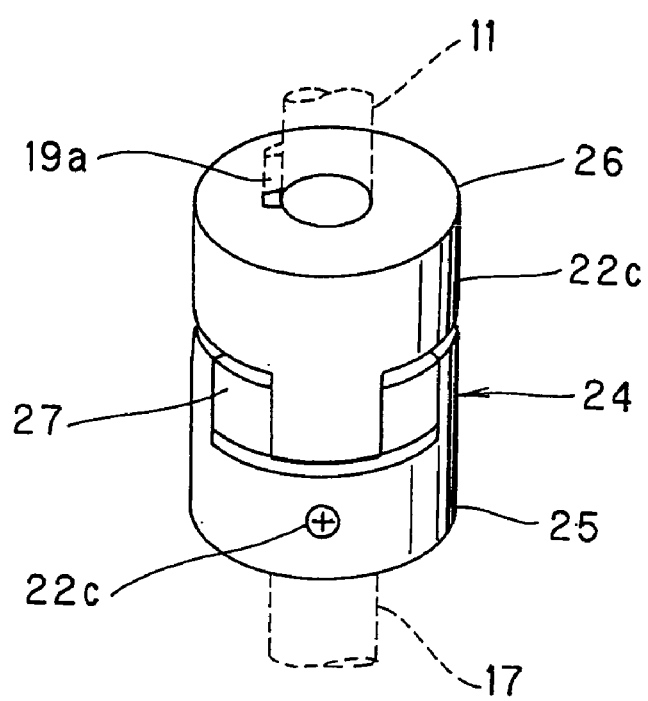
FIG. 5 is a perspective view showing a state in which the coupling is attached to a rotary shaft and a screw shaft.
Figure 6:
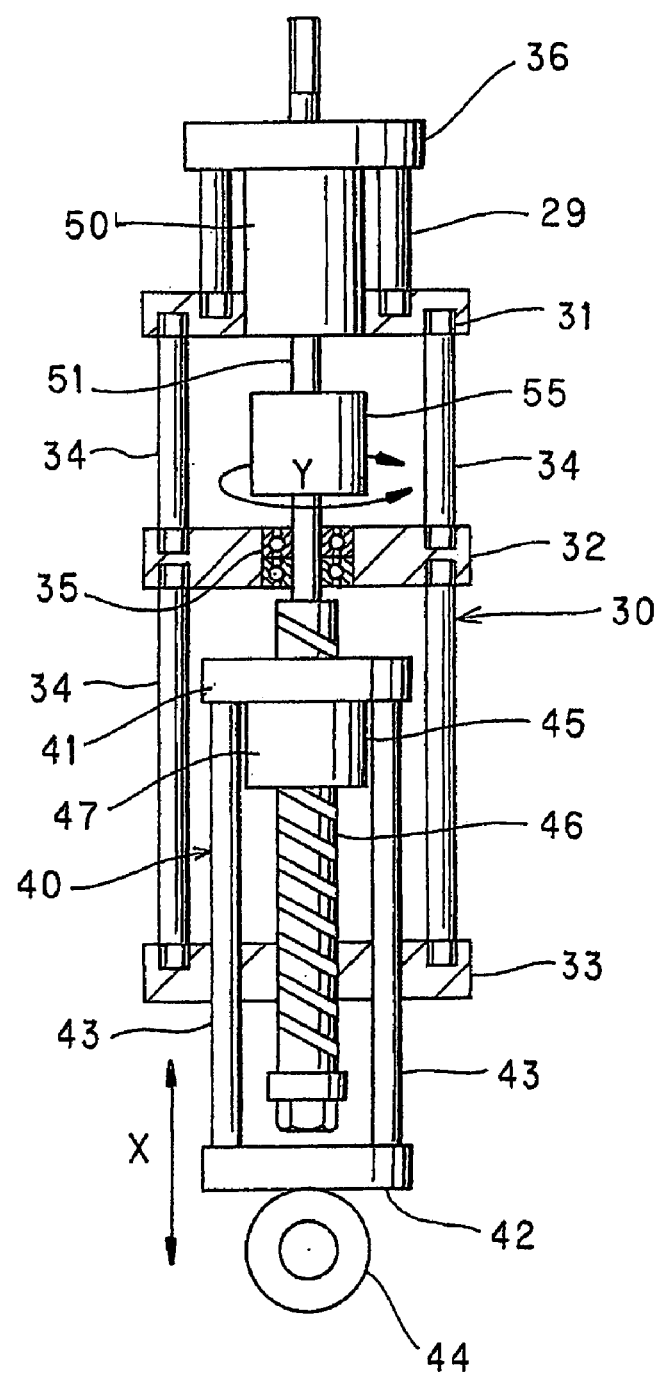
FIG. 6 is a block diagram of art which is related to the present invention.

As shown in FIG. 3 through FIG. 5, the coupling 24 is composed of a pair of a drive section 25 and a driven section 26 which are constituted identically with each other and an elastic body 27 which is interposed between the drive section 25 and the driven section 26.

Because the drive section 25 and the driven section 26 have the identical constitution, only one will be described.

As also shown in FIG. 3, a hole 22 is bored through the center of a cylindrical body 21 and a key way 22*a* is formed on an inner circumferential surface of the hole 22. The rotary shaft 11 of the motor 10 or the screw shaft 17 is inserted in the hole 22, and a key way not shown in the drawing is provided at the rotary shaft 11 and the screw shaft 17 as a mating key way of the key way 22*a*, respectively. A key 19*a* or 19*b* is inserted between the key way 22*a* and the key way of the rotary shaft 11 or the key way of the screw shaft 17.

Thus, the cylindrical body 21 is connected with the rotary shaft 11 or the screw shaft 17 to prevent their idle running. Additionally, a thread hole 22*b* which is bored through the hole 22 is formed on a side surface of the cylindrical body 21, and a spiral engaging stopper 22*c* is spirally engaged with the thread hole 22*b*, whereby the rotary shaft 11 or the screw shaft 17 is fixed to prevent the rotary shaft 11 or the screw shaft 17 from coming out in an axial direction.

Also, a pair of projections 23 are provided at the positions, which are symmetric with the hole 22 as the center, of end surfaces of the cylindrical body 21 which face each other. The projections are trapezoidal and, as it will be described later, form such a vulnerable section that the projections 23 are cut at the roots when strong torque acts in a direction of rotations.

As also shown in FIG. 5, the drive section 25 and the driven section 26 are combined in such a manner that their end surfaces face each other, and the projections 23 are engaged in such a manner that an elastic body 27 is interposed between the projections 23.

Therefore, as shown in FIG. 4, the elastic body 27 is formed by a cylindrical body 27*a* in the center and a spacer section 27*b* which extends from the cylindrical body 27*a* crosswise and in all directions. The spacer section 27*b* is formed in a shape of inverted trapezoid in such a manner that the spacer section 27*b* fits between the projection 23 and the projection 23 to be combined, namely, on a transmission surface of rotary torque leaving no space between them. Also, it is set that thickness of the elastic body 27 in an axial direction is approximately same as height of the projections 23 in axial direction of the drive section 25 and the driven section 26.

It is preferable that material of the elastic body 27 is a member which is easy of elastic deformation, such as rubber, but other materials, for example synthetic resin, are also acceptable.

FIG. 5 shows a state in which the screw shaft 17 is connected with the drive section 25 of the coupling 24 and the rotary shaft 11 of the motor 10 is connected with the driven section 26. In such a manner, the screw shaft 17 and the rotary shaft 11 are connected by means of the coupling 24 which elastic deformation in a direction of transmission of the rotary torque is possible. Thus, thrust, vibration or the like from the surface of a road acts on the electromagnetic shock absorber while a vehicle is traveling. When the linear motion of the internal cylinder 6 along the external cylinder 3 is converted into the rotary motion of the screw shaft 17 by the ball screw mechanism 15, rotations of the screw shaft 17 are transmitted to the rotary shaft 11 of the motor 10 through the coupling 24.

At this time, when rotary torque is applied from the screw shaft to the elastic body 27 which intervenes between the drive section 25 and the driven section 26, while shrinking in response to the torque, the elastic body 27 transmits the torque to the rotary shaft 11. In this case, if the rotary speed of the screw shaft 17 changes, transmission of the rotary speed to the rotary shaft 11 will be delayed according to quantity of compression of the elastic body 27.

More specifically, if external force in an axial direction is applied to the internal cylinder 6 of the electromagnetic shock absorber and the acceleration of the linear motion of the internal cylinder 6 along the external cylinder 3 is changed, the generation of moment of inertia of the rotor of the motor 10 will be delayed.

Thus, similarly to the above, it is possible to restrain generation of the damping force which is hard to control and is generated due to the moment of inertia of the rotor at the initial stage of telescopic motion of the electromagnetic shock absorber. Also, if the electromagnetic shock absorber is used as a shock absorber of a vehicle, it will make contributions to realization of a more comfortable vehicle to drive.

Further, by setting such that when rotary torque which a rotary speed of the motor 10 exceeds an allowable rotary speed inputs from the screw shaft 17, the projections 23 of the drive section 25 and the driven section 26 of the coupling 24 are broken, it is possible to prevent the motor 10 from being subjected to damage which may arise resulting from calorification at the time of exceeding an allowable rotary speed of the motor 10.

A cross section of the projection 23 is formed in a shape of trapezoid or sector in consideration of facilitation of processing work. However, the present invention aims that the projection 23 transmits rotary motion and when rotary torque greater than a fixed level is applied, the projection is broken. Thus, it is not restricted to the above-mentioned shape and other shapes are acceptable.

Further, a pair of projections 23 are provided at the drive section 25 and the driven section 26, respectively, but three or more projections may be provided at the drive section 25 and the driven section 26, respectively.

Each of the embodiments described above exemplifies that in the process of constituting the ball screw mechanism, the screw shaft is connected with the rotary shaft of the motor and the ball nut is connected with the internal cylinder, respectively. However, it is not restricted to the example. Of course, it is also possible to have such constitution that the screw shaft is fixed to the internal cylinder and slides with the internal cylinder in one united body without rotating, on the other hand, the ball nut is connected with the rotary shaft of the motor, the ball nut is rotated in response to movement of the screw shaft, and the rotary motion is transmitted to the motor.

The present invention is not restricted to the embodiments described above. It is obvious that the present invention includes various improvement and modification which can be made by a person skilled in the art within a scope of technical ideas given in the following claims.

INDUSTRIAL APPLICABILITY

The electromagnetic shock absorber according to the present invention can be applied as a shock absorber for a vehicle or the like.

The invention claimed is:

1. An electromagnetic shock absorber for a vehicle comprising:
  a shock absorber body which is interposed between a car body and an axle, and makes telescopic motion in response to an input from outside;
  a ball screw mechanism which is arranged at the shock absorber body, converts the telescopic motion into rotary motion, and is composed of a ball nut and a screw shaft;
  a motor having a rotary shaft, which is provided at the shock absorber body; and
  a power transmitting section having an elastic body which transmits rotary motion of the screw shaft of the ball screw mechanism to the rotary shaft of the motor and also shifts a transmission phase of the rotary motion when torque of the screw shaft is changed, said motor generating electromagnetic resistance according to shocks imparted to the vehicle, to oppose the rotary motion of the screw shaft transmitted to the motor rotary shaft,
  wherein the screw shaft is coaxially connected with the rotary shaft of the motor through the power transmitting section, and
  wherein the shock absorber body is composed of an external cylinder and an internal cylinder to be slidably inserted into the external cylinder, the motor is attached to the external cylinder, the ball nut of the ball screw mechanism is fixed to the internal cylinder, the screw shaft to be spirally engaged with the ball nut is rotatably supported by the external cylinder, and also the screw shaft is connected with the rotary shaft of the motor through the power transmitting section.

2. An electromagnetic shock absorber according to claim 1, wherein the power transmitting section is constituted such that at least a part of the power transmitting section includes a torsion bar.

3. An electromagnetic shock absorber according to claim 2, wherein the rotary shaft of the motor is connected with one end of the torsion bar and the screw shaft of the ball screw mechanism is connected with the other end of the torsion bar, respectively, and it is set such that the torsion bar will break if the torque is greater than a prescribed value.

4. An electromagnetic shock absorber according to claim 1, wherein the power transmitting section is constituted such that the power transmitting section is composed of a drive section and a driven section and the elastic body is provided on a torque transmission surface which intervenes between the drive section and the driven section.

5. An electromagnetic shock absorber according to claim 4, wherein the rotary shaft of the motor is connected with the drive section and the screw shaft of the ball screw mechanism is connected with the driven section.

6. An electromagnetic shock absorber according to claim 4, wherein the drive section and the driven section are coaxially arranged at the power transmitting section in such a manner that the drive section and the driven section face each other, wherein the drive section and the driven section have projections which project toward respective opposite surfaces and are engaged to each other in a direction of rotations, and wherein the elastic body intervenes between engaged surfaces of the projections.

7. An electromagnetic shock absorber according to claim 6, wherein the projections are constituted such that the projections will break if the torque is greater than a prescribed value.

8. An electromagnetic shock absorber according to claim 3, wherein the prescribed value corresponds to a torque value at a time when a rotational speed of the motor due to the torque reaches an allowable rotational speed.

* * * * *